United States Patent
Mochizuki et al.

(10) Patent No.: US 9,884,566 B2
(45) Date of Patent: Feb. 6, 2018

(54) STRADDLED ELECTRIC VEHICLE

(71) Applicant: YAMAHA HATSUDOKI KABUSHIKI KAISHA, Iwata-shi, Shizuoka (JP)

(72) Inventors: Toshiki Mochizuki, Shizuoka (JP); Shidehiko Miyashiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/163,740

(22) Filed: May 25, 2016

(65) Prior Publication Data
US 2016/0347199 A1 Dec. 1, 2016

(30) Foreign Application Priority Data
May 29, 2015 (JP) ................. 2015-110669

(51) Int. Cl.
B60L 11/18 (2006.01)
B62K 11/10 (2006.01)
B62K 25/28 (2006.01)

(52) U.S. Cl.
CPC ....... B60L 11/1879 (2013.01); B60L 11/1877 (2013.01); B62K 11/10 (2013.01); B62K 25/283 (2013.01); B62K 2204/00 (2013.01); B62K 2208/00 (2013.01)

(58) Field of Classification Search
CPC ............ B60L 11/1879; B60L 11/1877; B62K 25/283; B62K 11/10; B62K 2208/00; B62K 2204/00
See application file for complete search history.

(56) References Cited

U.S. PATENT DOCUMENTS

| 2004/0238242 | A1* | 12/2004 | Honda .................... B60K 1/00 180/65.1 |
| 2005/0092538 | A1 | 5/2005 | Baldwin et al. |
| 2005/0155802 | A1* | 7/2005 | Hirano .................... B60K 1/04 180/65.1 |
| 2006/0060400 | A1 | 3/2006 | Iwashita et al. |
| 2010/0078237 | A1 | 4/2010 | Yonehana et al. |
| 2010/0078249 | A1 | 4/2010 | Nishiura et al. |

(Continued)

FOREIGN PATENT DOCUMENTS

| EP | 2 168 863 A1 | 3/2010 |
| JP | 01-62928 U | 4/1989 |

(Continued)

Primary Examiner — Jacob D Knutson
(74) Attorney, Agent, or Firm — Keating and Bennett, LLP

(57) ABSTRACT

A battery with increased capacity is provided in a straddled electric vehicle including a drive unit provided on a rear arm for supporting a rear wheel such that the rear wheel is rotatable. A power supply unit is located in a vehicle body frame to supply electric power to the drive unit. The drive unit includes a motor that overlaps the rear wheel in a side view of the vehicle. The power supply unit includes a battery and a controller. The controller supplies electric power stored in the battery to the drive unit. The vehicle body frame includes a head pipe and a pivot shaft. The pivot shaft supports the rear arm such that it is swingable. The power supply unit is located between the head pipe and pivot shaft in a side view of the vehicle.

10 Claims, 6 Drawing Sheets

(56) References Cited

U.S. PATENT DOCUMENTS

| | | | |
|---|---|---|---|
| 2011/0288705 A1* | 11/2011 | Kawasaki | B60L 11/1803 701/22 |
| 2011/0295454 A1 | 12/2011 | Meyers | |
| 2012/0000724 A1 | 1/2012 | Mimura et al. | |
| 2012/0049797 A1* | 3/2012 | Tamaki | B60L 3/04 320/109 |
| 2012/0080254 A1* | 4/2012 | Tsukamoto | B62M 7/12 180/68.5 |
| 2012/0082881 A1* | 4/2012 | Tsukamoto | H01M 10/425 429/120 |
| 2012/0235639 A1 | 9/2012 | Hamauzu | |
| 2013/0161107 A1* | 6/2013 | Tsukamoto | B62K 11/10 180/220 |
| 2013/0175102 A1* | 7/2013 | Tsukamoto | B62K 11/10 180/21 |
| 2013/0277133 A1 | 10/2013 | Matsuda | |
| 2013/0299265 A1 | 11/2013 | Marazzi | |
| 2015/0122568 A1* | 5/2015 | Eguchi | B62H 1/02 180/220 |
| 2015/0210339 A1* | 7/2015 | Igarashi | B62K 25/283 180/220 |
| 2016/0347199 A1* | 12/2016 | Mochizuki | B60L 11/1877 |

FOREIGN PATENT DOCUMENTS

| | | | |
|---|---|---|---|
| JP | 06-72378 A | | 3/1994 |
| JP | 2006-056402 A | | 3/2006 |
| JP | 2006056402 A | * | 3/2006 |
| JP | 2007-509813 A | | 4/2007 |
| JP | 2009-078624 A | | 4/2009 |
| JP | 2009078624 A | * | 4/2009 |
| JP | 2010-083365 A | | 4/2010 |
| JP | 2010-083371 A | | 4/2010 |
| JP | 2010-233372 A | | 10/2010 |
| JP | 2012-206626 A | | 10/2012 |
| JP | 2013-154861 A | | 8/2013 |
| JP | 2013154861 A | * | 8/2013 |
| JP | 2014-507330 A | | 3/2014 |
| WO | 2012/090245 A1 | | 7/2012 |

* cited by examiner

STRADDLED ELECTRIC VEHICLE

BACKGROUND OF THE INVENTION

1. Field of the Invention

The present invention relates to a straddled electric vehicle.

2. Description of the Related Art

Recently, growing awareness of the environment has prompted proposals of straddled electric vehicles having a motor, instead of an engine, as a driving source. An example of a straddled electric vehicle is an electric motorcycle. As compared with a motorcycle with an engine as a driving source, an electric motorcycle uses a motor and a battery instead of an engine and a fuel tank. That is, a vehicle body frame for a motorcycle with an engine as a driving source may be used as the vehicle body frame of an electric motorcycle. In short, various types of electric motorcycles can be provided, as is the case with motorcycles with an engine as a driving source.

A motorcycle may be, for example, a motorcycle for providing the pleasure of riding it, or a motorcycle where practical use is considered. The latter, as compared with the former, may include a container box, for example, for practical use. The container box may be positioned above the rear wheel, for example. On the other hand, the former, as compared with the latter, has a large vertical range in which the rear wheel can swing, for example, to provide travelling performance. As such, in the former, it is difficult to provide a space in which a container box can be positioned above the rear wheel, as is possible with the latter.

An electric motorcycle having the arrangement of the former is disclosed in WO 2012/90245, for example. The electric motorcycle described in WO 2012/90245 provides a space in which a fuel tank and engine would be positioned in a motorcycle with an engine as a driving source, i.e., a space formed between the head pipe and the pivot shaft supporting the rear arm such that it is swingable, where a motor unit, a battery box and an electric control unit are positioned in this space. More specifically, the motor unit is positioned below the battery box. The electric control unit is provided on the lower side of the battery box, located forward of the motor unit.

SUMMARY OF THE INVENTION

In the electric motorcycle described in the above publication, the motor unit is located below the battery box. As such, it is difficult to increase the size of the battery box. Consequently, it is difficult to increase the capacity of the battery contained in the battery box.

Preferred embodiments of the present invention provide a battery with increased capacity in a straddled electric vehicle.

A straddled electric vehicle according to a preferred embodiment of the present invention includes: a rear wheel, a rear arm, a vehicle body frame, a seat, a drive unit, and a power supply unit. The rear arm supports the rear wheel such that it is rotatable. The vehicle body frame supports the rear arm such that it is swingable. The seat is located above the vehicle body frame. The drive unit is provided on the rear arm to rotate the rear wheel. The power supply unit is located in the vehicle body frame to supply electric power to the drive unit. The drive unit includes a motor. The motor overlaps the rear wheel in a side view of the vehicle. The power supply unit includes a battery and a controller. The controller supplies electric power stored in the battery to the drive unit. The vehicle body frame includes a head pipe and a pivot shaft. The pivot shaft supports the rear arm such that it is swingable. The power supply unit is located between the head pipe and the pivot shaft in a side view of the vehicle. A foremost point of the power supply unit is located forward of the seat. An uppermost point of the power supply unit is located higher than a lower side of the head pipe.

In the above straddled electric vehicle, the drive unit is located on the rear arm, making it possible to increase the size of the power supply unit. Since the size of the power supply unit is able to be increased, a battery with increased capacity is able to be included.

The foremost point of the power supply unit is located forward of the seat. Thus, the size of the power supply unit as measured in the front/rear direction of the vehicle is able to be increased. As such, a battery with increased capacity is able to be included.

The uppermost point of the power supply unit is located higher than the lower side of the head pipe. Thus, the size of the power supply unit as measured in the top/bottom direction of the vehicle can be increased. As such, a battery with increased capacity is able to be included.

Preferably, a lowermost point of the power supply unit is located lower than of a shaft center of the pivot shaft. In this case, the size of the power supply unit as measured in the top/bottom direction of the vehicle is able to be further increased. Thus, a battery with further increased capacity is able to be included.

Preferably, the lower side of the head pipe is located forward of a rearmost point of an upper side of the head pipe. The foremost point of the power supply unit is located forward of the rearmost point of the upper side of the head pipe.

In this case, the size of the power supply unit as measured in the front/rear direction of the vehicle is able to be further increased. Thus, a battery with further increased capacity is able to be included.

Preferably, a rearmost point of the power supply unit is located rearward of the pivot shaft. In this case, the size of the power supply unit is able to be further increased. Thus, a battery with further increased capacity is able to be included.

In the above straddled electric vehicle, the rear wheel includes a wheel body and a tire. The tire is attached to the wheel body. Preferably, the motor overlaps the wheel body in a side view of the vehicle.

In this case, the drive unit is able to be positioned close to the axle of the rear wheel. Thus, the length of the rear arm is able to be reduced. In other words, the pivot shaft is able to be positioned close to the axle of the rear wheel. As such, the space between the head pipe and pivot shaft, i.e. the space in which the power supply unit is to be positioned, is able to be enlarged. If this space is enlarged, the size of the power supply unit is able to be increased. That is, the capacity of the battery is able to be increased.

In an implementation where the motor overlaps the wheel body in a side view of the vehicle, preferably, a foremost point of the motor overlaps the tire in a side view of the vehicle. In this case, the drive unit is able to be positioned yet closer to the axle of the rear wheel. In other words, the pivot shaft is able to be positioned yet closer to the axle of the rear wheel. Thus, the space in which the power supply unit is to be positioned is able to be further enlarged. As such, the size of the power supply unit is able to be further increased, and thus a battery with further increased capacity is able to be included.

In an implementation where the motor overlaps the wheel body in a side view of the vehicle, preferably, an output shaft of the motor extends in a width direction of the vehicle. As the size of the motor as measured in a radial direction is increased, a certain output of the motor is able to be provided even if the size of the motor as measured in the axial direction of the output shaft of the motor is reduced. Thus, in an implementation where the output shaft of the motor extends in the width direction of the vehicle, the size of the motor as measured in the vehicle width direction is able to be reduced while providing a certain output of the motor.

Since the motor overlaps the wheel body in a side view of the vehicle, it is possible to prevent the length of the rear arm from increasing even when the size of the motor as measured in a radial direction is increased. In other words, it is possible to prevent the space in which the power supply unit is to be positioned from being narrowed, which would occur when the pivot shaft is moved toward the front of the vehicle. As such, the size of the power supply unit is able to be increased and a battery with increased capacity is able to be included.

Preferably, the battery is located above the controller. A lowermost point of the controller is located lower than a swing center of the rear arm.

In this case, the size of the battery as measured in the front/rear direction of the vehicle is able to be increased. Thus, the capacity of the battery is able to be increased.

The controller is able to be positioned closer to the drive unit than when the controller is located forward of the battery. Thus, the length of the lines connecting the controller with the drive unit is able to be reduced.

In an implementation where the battery is located above the controller, preferably, a foremost point of the controller is located rearward of a foremost point of the battery. In this case, the controller is able to be positioned yet closer to the drive unit. Thus, the length of the lines connecting the controller with the drive unit is able to be further reduced.

In an implementation where the battery is located above the controller, preferably, a rearmost point of the controller is located rearward of a center of the battery as measured in a front/rear direction. In this case, the controller is able to be positioned still closer to the drive unit. Thus, the length of the lines connecting the controller with the drive unit is able to be further reduced.

In an implementation where the battery is located above the controller, preferably, a lowermost point of a front side of the battery is located lower than the lower side of the head pipe. In this case, the size of the battery as measured in the top/bottom direction of the vehicle is able to be increased. Thus, the capacity of the battery is able to be increased.

In an implementation where the battery is located above the controller, preferably, the vehicle body frame includes a left first frame member and a right first frame member and a left second frame member and a right second frame member. The left and right first frame members extend rearward from the head pipe. The left and right second frame members are located lower than the left and right first frame members and extend rearward from the head pipe. The battery overlaps the left and right first frame members and the left and right second frame members in a side view of the vehicle.

The battery overlaps the left and right first frame members and the left and right second frame members in a side view of the vehicle. Thus, the size of the battery as measured in the top/bottom direction of the vehicle is able to be increased. As such, the capacity of the battery is able to be increased.

In a straddled electric vehicle according to a preferred embodiment of the present invention, the battery may be located rearward of the controller and a lowermost point of the battery may be located lower than the pivot shaft. In this case, the size of the battery as measured in the top/bottom direction of the vehicle is able to be increased. As such, the capacity of the battery is able to be increased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
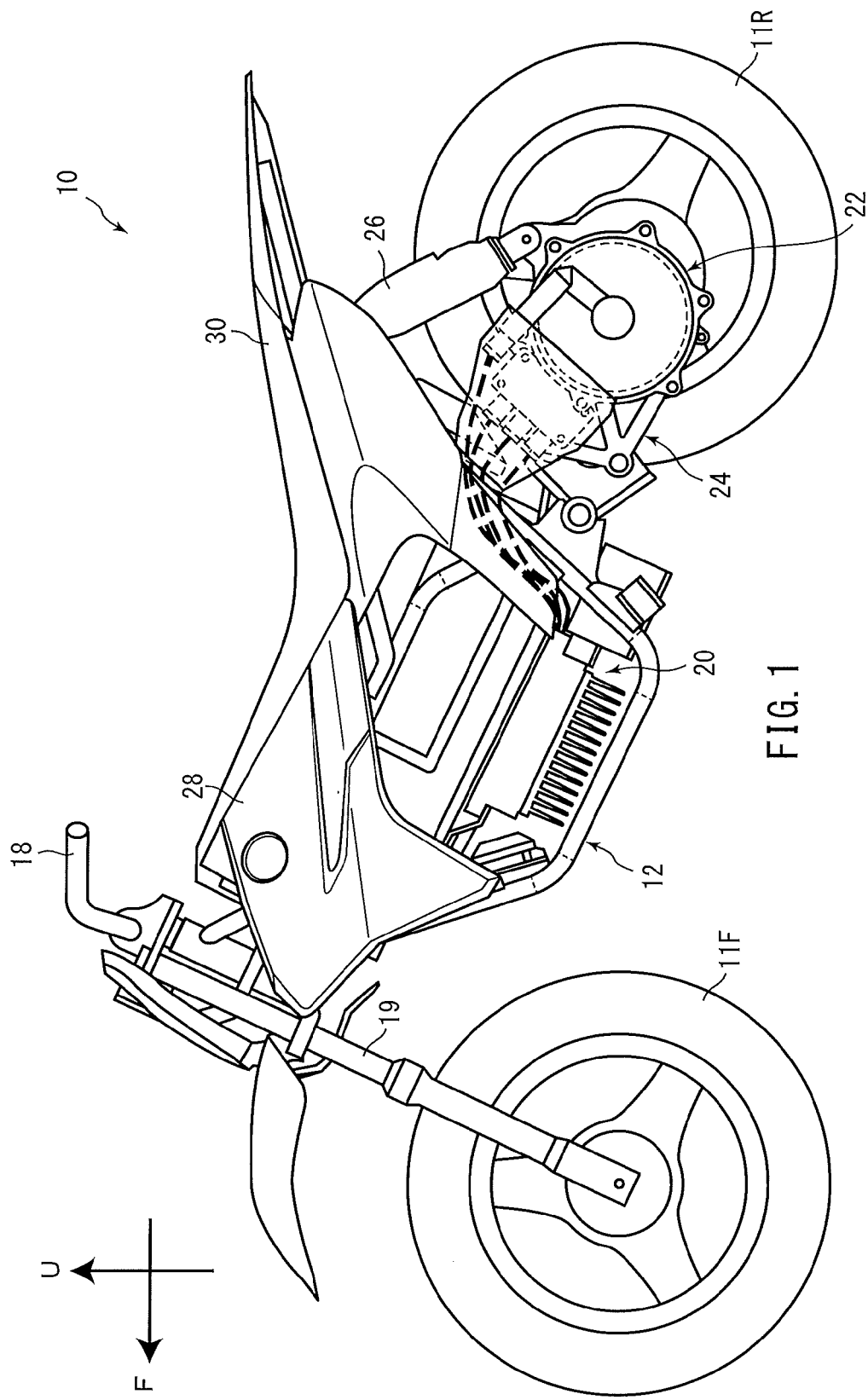
FIG. 1 is a left side view of an electric motorcycle according to a preferred embodiment of the present invention.

Now, straddled electric vehicles according to preferred embodiments of the present invention will be described with reference to the drawings. The present preferred embodiment describes an electric motorcycle as an example of a straddled electric vehicle. The same or corresponding portions in the drawings are labeled with the same numerals and their description will not be repeated.

Figure 2:
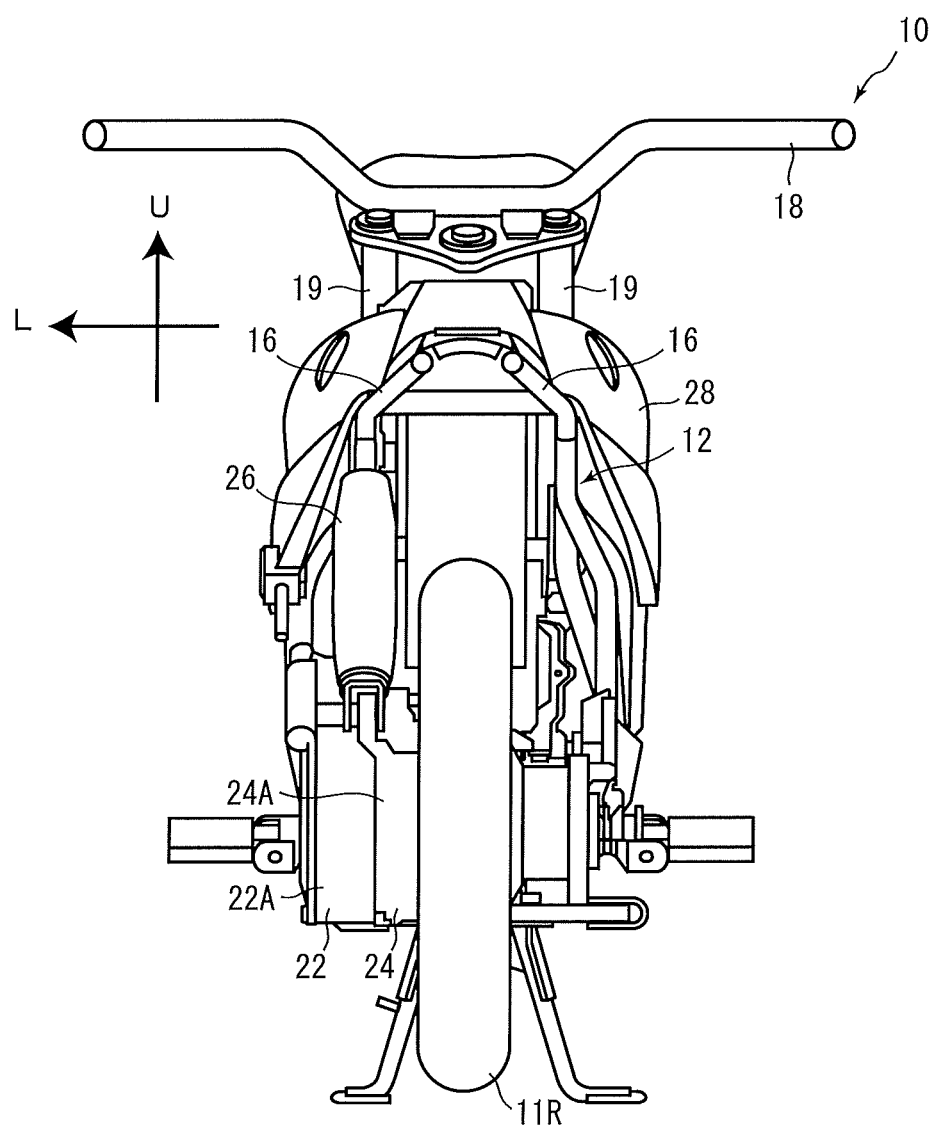
FIG. 2 is a rear view of the electric motorcycle according to a preferred embodiment of the present invention.
Figure 3:
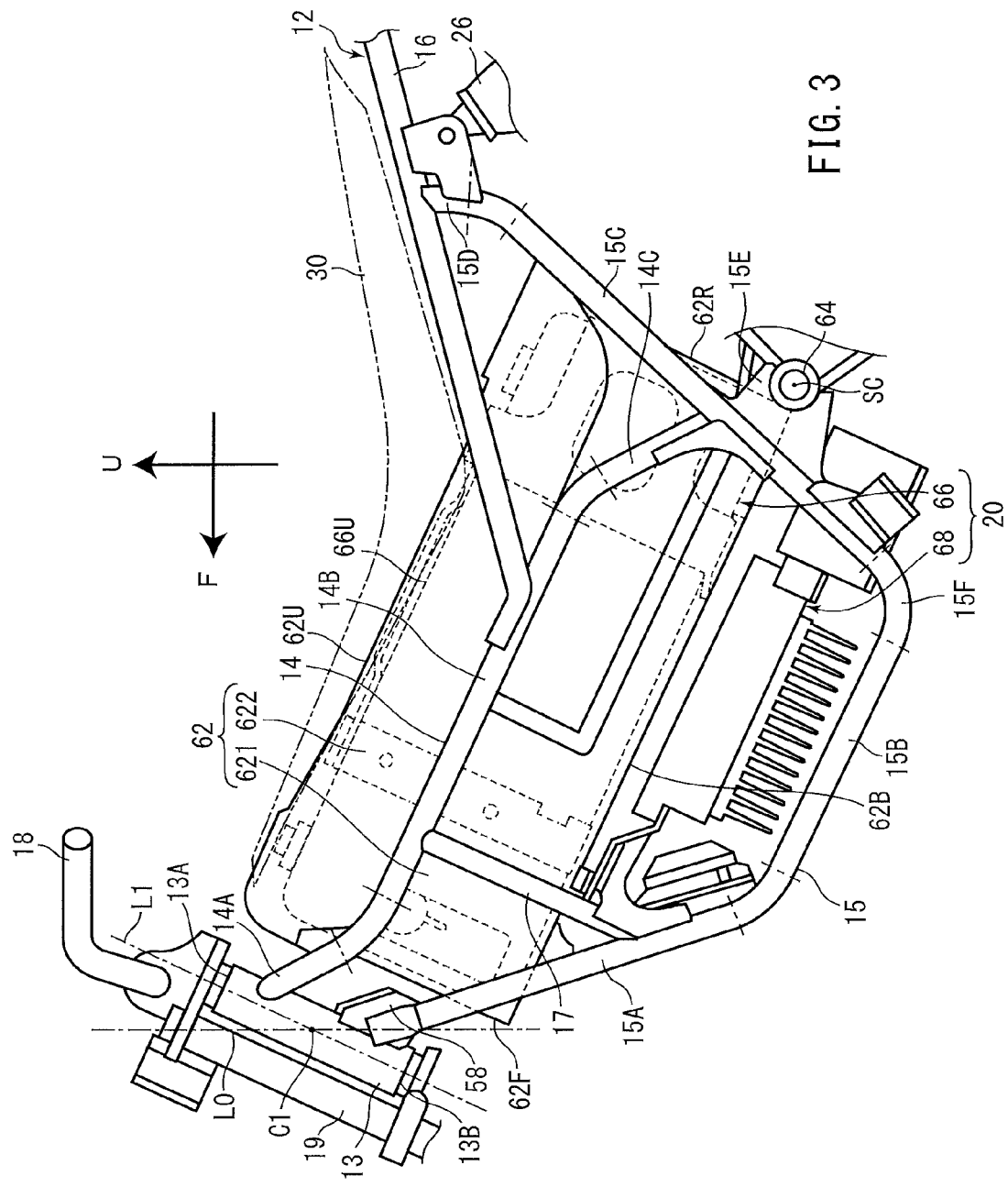
FIG. 3 is an enlarged left side view of apart of the electric motorcycle according to a preferred embodiment of the present invention without the vehicle body cover.
Figure 4:
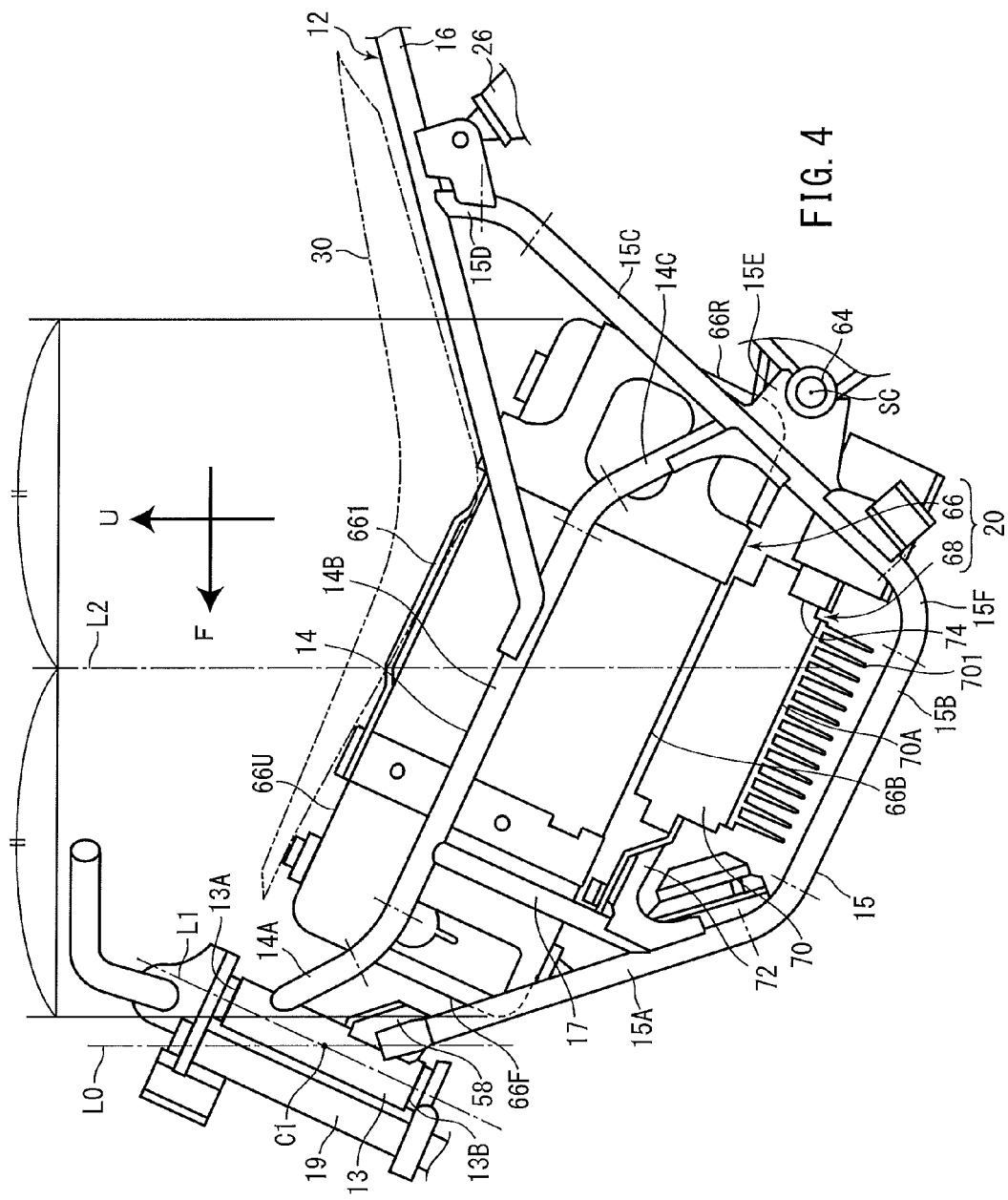
FIG. 4 is a left side view illustrating the positional relationship between the power supply unit and vehicle body frame.
Figure 5:
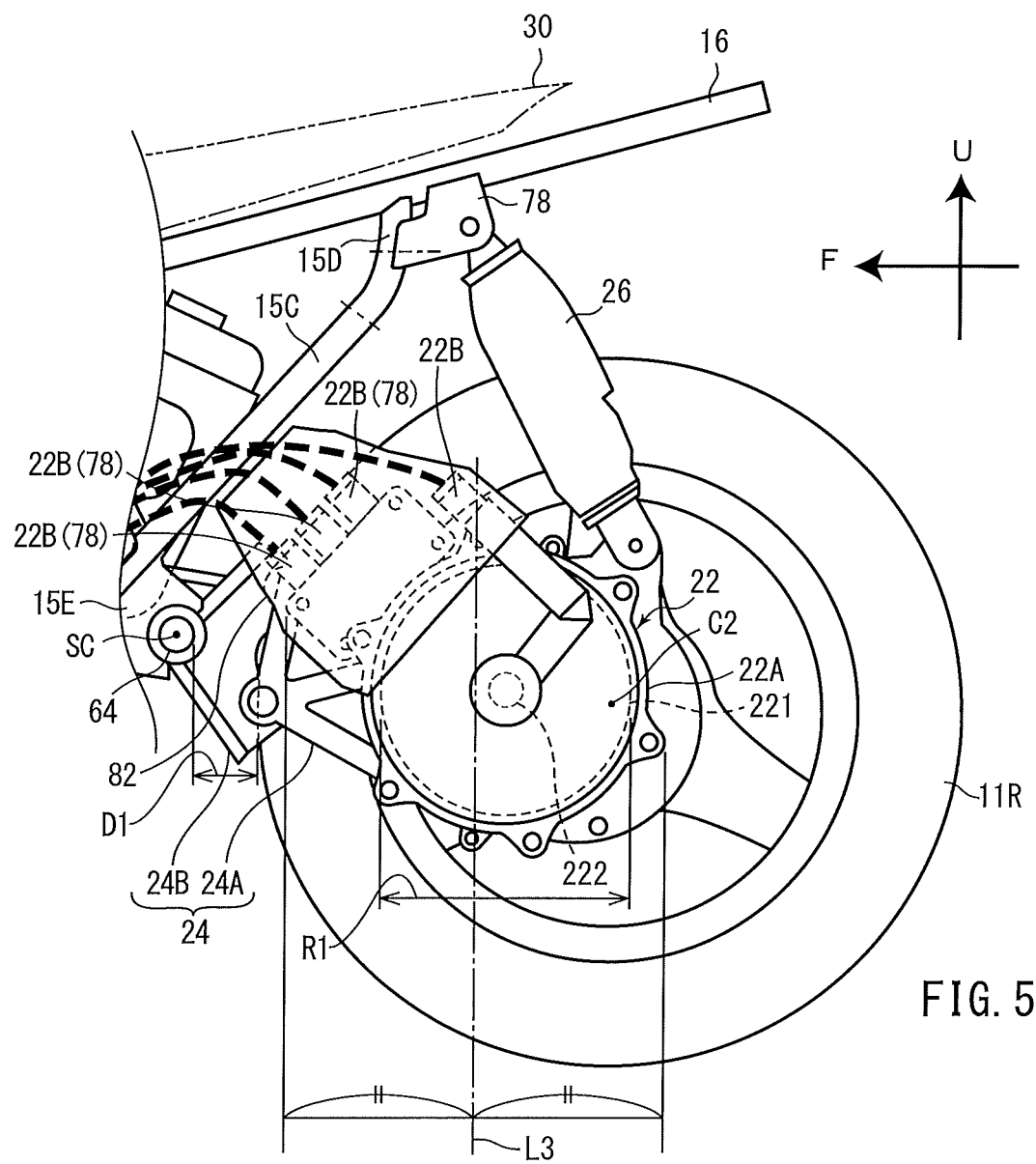
FIG. 5 is a left side view illustrating the positional relationship of the rear arm, drive unit and rear cushion.

FIG. 1 is a left side view of an electric motorcycle 10 according to a preferred embodiment of the present invention. FIG. 2 is a rear view of the electric motorcycle 10. FIG. 3 is an enlarged left side view of a portion of the electric motorcycle 10 without the vehicle body cover 28. FIG. 4 is a left side view illustrating the positional relationship between the power supply unit and vehicle body frame. FIG. 5 is a left side view illustrating the positional relationship between the rear arm, drive unit and rear cushion.

In the following description, front/forward, rear(ward), left and right mean such directions as perceived by a rider sitting on the seat 30 of the electric motorcycle 10. In FIGS. 1, 3, 4 and 5, arrow F indicates the forward direction with respect to the electric motorcycle 10, while arrow U indicates the upward direction with respect to the electric motorcycle 10. In FIG. 2, arrow L indicates the left direction with respect to the electric motorcycle 10, while arrow U indicates the upward direction with respect to the electric motorcycle 10.

First, the overall construction of the electric motorcycle 10 will be described with reference to FIG. 1. The electric motorcycle 10 includes a front wheel 11F, a rear wheel 11R, a vehicle body frame 12, handlebars 18, a front fork 19, a power supply unit 20, a drive unit 22, a rear arm 24, a rear cushion 26, a vehicle body cover 28, and a seat 30.

The front fork 19 supports the front wheel 11F such that it is rotatable. Operating the handlebars 18 changes the direction of the front wheel 11F.

The vehicle body frame 12 supports the rear arm 24 such that it can swing in the top/bottom direction. The rear arm 24 supports the rear wheel 11R such that it is rotatable. The rear cushion 26 is located between the rear arm 24 and vehicle body frame 12. The drive unit 22 is located on the rear arm 24.

The vehicle body frame 12 supports the power supply unit 20. The power supply unit 20 supplies electric power to the drive unit 24 to drive the drive unit 24. This rotates the rear wheel 11R.

The vehicle body frame 12 supports the vehicle body cover 28. The vehicle body cover 28 covers a portion of the vehicle body frame 12 in a side view of the vehicle.

The vehicle body frame 12 supports the seat 30. The seat 30 is located above the vehicle body frame 12.

The vehicle body frame 12 will be described in detail below with reference to FIG. 3. The vehicle body frame 12 includes a head pipe 13, a left upper frame member and a right upper frame member, both denoted by 14, a left lower frame member and a right lower frame member, both denoted by 15, a left seat rail and a right seat rail, both denoted by 16, and a left coupling frame member and a right coupling frame member, both denoted by 17.

The head pipe 13 is located at the front of the vehicle body frame 12. A steering shaft is inserted into the head pipe 13. The top and bottom ends of the steering shaft are connected to the front fork 19. The handlebars 18 are connected to the top end of the steering shaft. Operating the handlebars 18 causes the steering shaft to turn, which in turn moves the front fork 19. The front fork 19 is rotated in a circumferential direction about the central axis L1 of the head pipe 13. As the front fork 19 rotates, the direction of the front wheel 11F is changed.

The central axis L1 of the head pipe 13 is angled relative to a reference line L0 extending vertically through the point that is located on the central axis of the head pipe 13 and equally divides the axial length of the head pipe 13 (i.e., center C1 of the head pipe 13 as measured in the axial direction).

The head pipe 13 has an upper side 13A. The upper side 13A expands in directions perpendicular or substantially perpendicular to the central axis L1. It should be noted that the upper side 13A need not be exactly perpendicular or substantially perpendicular to the central axis L1. The foremost point of the upper side 13A is located higher than the rearmost point of the upper side 13A in a side view of the vehicle.

The head pipe 13 has a lower side 13B. The lower side 13B expands in directions perpendicular or substantially perpendicular to the central axis L1. That is, the lower side 13B is parallel or substantially parallel to the upper side 13A. It should be noted that the lower side 13B need not be exactly perpendicular or substantially perpendicular to the central axis L1, nor exactly parallel or substantially parallel to the upper side 13A. The foremost point of the lower side 13B is located higher than the rearmost point of the lower side 13B in a side view of the vehicle. The rearmost point of the lower side 13B is located forward of the upper side 13A in a side view of the vehicle.

The left and right upper frame members 14 are separated from each other and arranged in the vehicle width direction (i.e. left/right direction). In the present preferred embodiment, the left and right upper frame members 14 preferably have the same shape and arranged in a symmetrical fashion.

In view of this, only one of the upper frame members 14 will be described below and the other upper frame member 14 will not be described.

The upper frame member 14 extends in the front/rear direction in a side view of the vehicle. The upper frame member 14 includes a front portion 14A, an intermediate portion 14B and a rear portion 14C. The front portion 14A, intermediate portion 14B and rear portion 14C will be described below. In FIG. 3, the ends of the front portion 14A, intermediate portion 14B and rear portion 14C are indicated by chain lines.

The front end of the front portion 14A is located higher than the center C1 and is connected to the head pipe 13. The front end of the front portion 14A is located higher than the rear end of the front portion 14A in a side view of the vehicle.

The intermediate portion 14B is located rearward of and lower than the front portion 14A. The front end of the intermediate portion 14B is located higher than the rear end of the intermediate portion 14B in a side view of the vehicle.

The rear portion 14C is located rearward of and lower than the intermediate portion 14B. The rear end of the rear portion 14C is connected to the lower frame member 15. The front end of the rear portion 14C is located higher than the rear end of the rear portion 14C.

The left and right lower frame members 15 are separated from each other and arranged in the vehicle width direction (i.e. left/right direction). In the present preferred embodiment, the left and right lower frame members 15 have the same shape and arranged in a symmetrical fashion. In view of this, only one of the lower frame members 15 will be described below and the other lower frame member 15 will not be described.

The lower frame member 15 extends in the front/rear direction in a side view of the vehicle. The lower frame member 15 includes a front portion 15A, a first intermediate portion 15B, a second intermediate portion 15C and a rear portion 15D. The front portion 15A, first intermediate portion 15B, second intermediate portion 15C and rear portion 15D will be described below. In FIG. 3, the ends of the front portion 15A, first intermediate portion 15B, second intermediate portion 15C and rear portion 15D are indicated by chain lines.

The front end of the front portion 15A is connected to the head pipe 13, where a bracket 58 provided on the head pipe 13 is located therebetween. The bracket 58 is provided on the head pipe 13 and is located lower than the center C1. That is, the front end of the front portion 15A is located lower than the center C1 and is connected to the head pipe 13. The front end of the front portion 15A is located higher than the rear end of the front portion 15A in a side view of the vehicle.

The first intermediate portion 15B is located rear of and lower than the front portion 15A. The front end of the first intermediate portion 15B is located higher than the rear end of the first intermediate portion 15B in a side view of the vehicle.

The second intermediate portion 15C is located rearward of the first intermediate portion 15B. The front end of the second intermediate portion 15C is located lower than the rearward of the second intermediate portion 15C in a side view of the vehicle. That is, a portion 15F located between the first and second intermediate portions 15B and 15C is located lowermost of the lower frame member 15. The rear portion 14C of the upper frame member 14 is connected to the second intermediate portion 15C. The rear end of the second intermediate portion 15C is located higher than the lowermost point of the first intermediate portion 15B in a side view of the vehicle.

The rear portion 15D is located rearward of and higher than the second intermediate portion 15C. The rear end of the rear portion 15D is connected to the seat rail 16. The front end of the rear portion 15D is located lower than the rear end of the rear portion 15D in a side view of the vehicle.

The left and right seat rails 16 are separated from each other and extend in the vehicle width direction (i.e. left/right direction). In the present preferred embodiment, the left and right seat rails 16 preferably have the same shape and arranged in a symmetrical fashion. In view of this, only one of the seat rails 16 will be described below and the other seat rail 16 will not be described.

The seat rail 16 supports the seat 30. The seat rail 16 extends in the front/rear direction in a side view of the vehicle. The front end of the seat rail 16 is connected to the intermediate portion 14B of the upper frame member 14. The front end of the seat rail 16 is located lower than the rear end of the seat rail 16 in a side view of the vehicle. The rear portion 15D of the lower frame member 15 is connected to the seat rail 16.

The left and right coupling frame members 17 are separated from each other and extend in the vehicle width direction (i.e. left/right direction). In the present preferred embodiment, the left and right coupling frame members 17 preferably have the same shape and arranged in a symmetrical fashion. In view of this, only one of the coupling frame members 17 will be described below and the other coupling frame member 17 will not be described.

The coupling frame member 17 couples the upper and lower frame members 14 and 15. The coupling frame member 17 extends in the top/bottom direction in a side view of the vehicle. The upper end of the coupling frame member 17 is located rearward of the lower end of the coupling frame member 17 in a side view of the vehicle. The upper end of the coupling frame member 17 is connected to the intermediate portion 14B of the upper frame member 14. The lower end of the coupling frame member 17 is connected to the front portion 15A of the lower frame member 15.

The power supply unit 20 will be described in detail below with reference to FIGS. 3 and 4. The power supply unit 20 includes a battery 66 and a controller 68.

The electric motorcycle 10 preferably also includes a battery box 62. The battery box 62 will be described with reference to FIG. 3.

The battery box 62 contains a battery 66. The battery box 62 is located above the controller 68. The battery box 62 is supported by the vehicle body frame 12.

The battery box 62 includes a body 621 and a lid 622. The lid 622 covers an opening in the body 621. Thus, a space is provided in the battery box 62. The battery 66 is contained in this space.

In a side view of the vehicle, the battery box 62 overlaps the upper frame member 14, lower frame member 15, seat rail 16 and coupling frame member 17. That is, the battery box 62 is protected by the left and right upper frame members 14, left and right lower frame members 15, left and right seat rails 16, and left and right coupling frame members 17.

The body 621 of the battery box 62 has a front side 62F, a rear side 62R and a lower side 62B. The front side 62, rear side 62R and lower side 62B will be described below.

The front side 62F is located rearward of the head pipe 13. The front side 62F is located forward of the controller 68 in a side view of the vehicle. The front side 62F crosses the front portion 14A of the upper frame member 14 and the front portion 15A of the lower frame member 15 in a side view of the vehicle. The front side 62F is located forward of the coupling frame member 17 in a side view of the vehicle.

The lowermost point of the front side 62F is located forward of the rearmost point of the upper side 13A of the head pipe 13 and the front end of the seat 30. That is, the foremost point of the body 621 is located forward of the rearmost point of the upper side 13A of the head pipe 13 and the front end of the seat 30.

The lowermost point of the front side 62F is located lower than the lower side 13B of the head pipe 13. The lowermost point of the front side 62F is located generally lower than the front portion 15A of the lower frame member 15.

The rear side 62R is located rearward of the upper frame member 14 in a side view of the vehicle. The rear side 62R is located lower than the seat rail 16 in a side view of the vehicle. The rear side 62R is located rearward of the controller 68 in a side view of the vehicle. The rear side 62R overlaps the second intermediate portion 15C of the lower frame member 15 in a side view of the vehicle.

A major portion of the rear side 62R is located higher than a pivot shaft 64 included by the vehicle body frame 12 in a side view of the vehicle. The pivot shaft 64 supports the rear arm. 24 such that it is able to swing about a support piece 15E provided on the second intermediate portion 15C. That is, a major portion of the rear side 62R is located higher than the shaft center of the pivot shaft 64, i.e., the swing center SC of the rear arm 24 in a side view of the vehicle. The lowermost point of the rear side 62R is the same or substantially at the same position as the shaft center of the pivot shaft 64.

The uppermost point of the rear side 62R is located rearward of the lowermost point of the rear side 62R. The uppermost point of the rear side 62R is located rearward of the swing center SC in a side view of the vehicle.

The rearmost point of the rear side 62R is located forward of the swing center SC in a side view of the vehicle. The lowermost point of the rear side 62R is located generally rearward of the second intermediate portion 15C of the lower frame member 15 in a side view of the vehicle.

The lower side 62B is located above the controller 68 in a side view of the vehicle. The front portion of the lower side 62B crosses the front portion 15A and coupling frame member 17 in a side view of the vehicle. The rear portion of the lower side 62B crosses the second intermediate portion 15C of the lower frame member 15 in a side view of the vehicle. The lower side 62B is located lower than the upper frame member 14 in a side view of the vehicle. The lower side 62B is located higher than the first intermediate portion 15B of the lower frame member 15 in a side view of the vehicle.

The foremost point of the lower side 62B is located higher than the rearmost point of the lower side 62B. The foremost point of the lower side 62B is located higher than the controller 68. The foremost point of the lower side 62B is located generally forward of the front portion 15A of the lower frame member 15.

The rearmost point of the lower side 62B overlaps the support piece 15E in a side view of the vehicle. That is, the rearmost point of the lower side 62B is located generally rearward of the second intermediate portion 15C of the lower frame member 15 in a side view of the vehicle.

The lid 622 of the battery box 62 has an upper side 62U. The upper side 62U will be described below.

The upper side 62U is located higher than the upper frame member 14 in a side view of the vehicle. The upper side 62U crosses the seat rail 16 in a side view of the vehicle. The foremost point of the upper side 62U is located higher than the rearmost point of the upper side 62U.

The seat 30 is located above the upper side 62U. That is, the seat 30 covers at least part of the upper side 62U. In other words, the seat 30 covers at least part of the lid 622 of the battery box 62.

The battery 66 stores electric power. The electric power is supplied to the drive unit 22 via the controller 68.

The battery 66 will be described with reference to FIG. 4. The battery 66 has a front side 66F, a rear side 66R, a lower side 66B and an upper side 66U. The front side 66F, rear side 66R, lower side 66B and upper side 66U will be described below.

The front side 66F is located rearward of the front side 62F of the battery box 62. The front side 66F is located rearward of the head pipe 13. The front side 66F is located forward of the controller 68 in a side view of the vehicle. The front side 66F crosses the front portion 14A of the upper frame member 14 and the front portion 15A of the lower frame portion 15 in a side view of the vehicle. The front side 66F is located forward of the coupling frame member 17 in a side view of the vehicle.

The lowermost point of the front side 66F is located forward of the uppermost point of the front side 66F. The lowermost point of the front side 66F is located lower than the lower side 13B of the head pipe 13. The lowermost point of the front side 66F overlaps the front portion 15A of the lower frame member 15 in a side view of the vehicle.

The lowermost point of the front side 66F is located forward of the rearmost point of the upper side 13A of the head pipe 13 and the front end of the seat 30. That is, the foremost point of the battery 66 is located forward of the rearmost point of the upper side 13A of the head pipe 13 and the front end of the seat 30. In other words, the foremost point of the power supply unit 20 is located forward of the rearmost point of the upper side 13A of the head pipe 13 and the front end of the seat 30.

The uppermost point of the front side 66F is located higher than the intermediate portion 14B of the upper frame member 14 and the center C1 of the head pipe 13 in a side view of the vehicle. That is, the uppermost point of the battery 66 is located higher than the intermediate portion 14B and center C1. In other words, the uppermost point of the power supply unit 20 is located higher than the intermediate portion 14B and center C1. In yet other words, the uppermost point of the power supply unit 20 is located higher than the lower side 13B of the head pipe 13.

The rear side 66R is located forward of the rear side 66R of the battery box 62. The rear side 66R is located rearward of the upper frame member 14 in a side view of the vehicle. The rear side 66R is located lower than the seat rail 16 in a side view of the vehicle. The rear side 66R is located rearward of the controller 68 in a side view of the vehicle. The rear side 66R crosses the second intermediate portion 15C of the lower frame member 15 in a side view of the vehicle.

The rear side 66R is located higher than the pivot shaft 64 in a side view of the vehicle. That is, The rear side 66R is located higher than the swing center SC of the rear arm 24 in a side view of the vehicle.

The uppermost point of the rear side 66R is located rearward of the swing center SC in a side view of the vehicle. That is, the rearmost point of the battery 66 is located rearward of the swing center SC (i.e., a shaft center of the pivot shaft 64) in a side view of the vehicle. In other words, the rearmost point of the power supply unit 20 is located rearward of the swing center SC (i.e., a shaft center of the pivot shaft 64) in a side view of the vehicle.

The lowermost point of the rear side 66R is located forward of the uppermost point of the rear side 66R. The lowermost point of the rear side 66R is located forward of the swing center SC in a side view of the vehicle.

In a side view of the vehicle, the lowermost point of the rear side 66R is located generally lower than the second intermediate portion 15C of the lower frame member 15 and overlaps the support piece 15E. That is, in a side view of the vehicle, the lowermost point of the battery 66 is located generally lower than the second intermediate portion 15C and overlaps the support piece 15E.

The lower side 66B is located higher than the lower side 62B of the battery box 62. The foremost point of the lower side 66B is located higher than the rearmost point of the lower side 66B.

The lower side 66B is located higher than the controller 68 in a side view of the vehicle. The front end of the lower side 66B overlaps the front portion 15A in a side view of the vehicle. The front portion of the lower side 66B crosses the coupling frame member 17 in a side view of the vehicle. The rear portion of the lower side 66B crosses the second intermediate portion 15C of the lower frame member 15. The rear end of the lower side 66B overlaps the support piece 15E in a side view of the vehicle. The lower side 66B is located lower than the upper frame member 14 in a side view of the vehicle. The lower side 66B is located higher than the first intermediate portion 15B of the upper frame member 14 in a side view of the vehicle.

The upper side 66U is located higher than the upper frame member 14 in a side view of the vehicle. That is, the uppermost point of the battery 66 is located higher than the upper frame member 14 in a side view of the vehicle.

The upper side 66U crosses the seat rail 16 in a side view of the vehicle. The foremost point of the upper side 66U is located higher than the rearmost point of the upper side 66U.

A grip 661 is provided on the upper side 66U. The user can hold the grip 661 and remove the battery 66 through the upper side of the battery box 62.

How the battery 66 is removed from the battery box 62 will be described in detail. As shown in FIG. 3, the upper side 66U is covered with the lid 622 of the battery box 62. Further, part of the lid 622 is covered with the seat 30. When the battery 66 is removed from the battery box 62, first, the seat 30 is detached. Next, the lid 622 is opened. Thereafter, the battery 66 is removed upward from the body 621 of the battery box 62.

The controller 68 will be described with reference to FIG. 4. The controller 68 supplies electric power stored in the battery 66 to the drive unit 22. The controller 68 is smaller than the battery 66 as measured in a side view of the vehicle.

The controller 68 is located lower than the battery box 62. That is, the controller 68 is located lower than the battery 66. In other words, the controller 68 does not overlap the battery 66 in a side view of the vehicle.

The controller 68 is located higher than the first intermediate portion 15B of the lower frame member 15 in a side view of the vehicle. The controller 68 is located rearward of the front portion 15A of the lower frame member 15 and the coupling frame member 17 in a side view of the vehicle. The controller 68 is located forward of the second intermediate portion 15C of the lower frame member 15 and the rear portion 14C of the upper frame member 14 in a side view of the vehicle.

The controller 68 includes a circuit board and a housing 70 to contain the circuit board. The housing 70 has a lower side 70A.

The lower side 70A defines the housing 70 from below in a side view of the vehicle. The uppermost point of the lower side 70A is located higher than the rearmost point of the lower side 70A. The rearmost point of the lower side 70A is located lower than the swing center SC of the rear arm 24 in a side view of the vehicle.

A heat sink 701 is provided on the lower side 70A. The portions of the heat sink 701 located close to the rearmost point of the lower side 70A are located lower than the swing center SC. That is, the lowermost point of the controller 68 is located lower than the swing center SC (i.e., a shaft center of the pivot shaft 64). In other words, the lowermost point of the power supply unit 20 is located lower than the swing center SC (i.e., a shaft center of the pivot shaft 64).

The front portion of the housing 70 is attached to the front portion 15A of the lower frame member 15 by a bracket 72. The rear portion of the housing 70 is attached to the second intermediate portion 15C of the lower frame member 15 by a bracket 74. That is, the controller 68 is supported by the lower frame member 15 by the brackets 72 and 74.

The controller 68 is located rearward of the front side 66F of the battery 66. The rearmost point of the lower side 70A of the housing 70 is located rearward of a straight line L2 extending vertically through the point that equally divides the length of the battery 66 as measured in the front/rear direction in a side view (i.e., a center of the battery 66 as measured in the front/rear direction). In other words, the rearmost point of the controller 68 is located rearward of the straight line L2 in a side view of the vehicle.

The foremost point of the lower side 70A of the housing 70 is located rearward of the front portion 15A of the lower frame member 15 and the front end of the first intermediate portion 15B of the lower frame member 15 in a side view of the vehicle. That is, the controller 68 is located rearward of the front portion 15A and the front end of the first intermediate portion 15B in a side view of the vehicle.

The rearmost point of the lower side 70A of the housing 70 is located rearward of the rear end of the first intermediate portion 15B of the lower frame member 15 in a side view of the vehicle. That is, the rearmost point of the controller 68 is located rearward of the rear end of the first intermediate portion 15B in a side view of the vehicle.

The rear arm 24, rear cushion 26 and drive unit 22 will now be described in detail with reference to FIG. 5.

The rear arm 24 supports the rear wheel 11R such that it is rotatable. The rear arm 24 supports the drive unit 22. The rear arm 24 includes an attachment 24A and a support member 24B.

The attachment 24A supports the drive unit 22. As shown in FIG. 2, the attachment 24A is located to the left of the rear wheel 11R and between the rear wheel 11R and drive unit 22 as viewed from the rear of the vehicle. That is, the drive unit 22 is attached to the left side of the attachment 24A.

Returning to FIG. 5, the rear portion of the support member 24B supports the attachment 24A. The front portion of the support member 24B is supported by the support piece 15E of the second intermediate portion 15C of the lower frame member 15 by the pivot shaft 64. The support member 24B is swingable about the pivot shaft 64, i.e., a swing center SC.

In the present preferred embodiment, the distance D1 between the rearmost point of the pivot shaft 64 and the foremost point of the rear wheel 11R as measured in a side view of the vehicle preferably is smaller than the diameter R1 of an electric motor 221, described below.

The rear cushion 26 is located between the vehicle body frame 12 and rear arm 24. The rear cushion 26 is located rearward of the lower frame member 15 and lower than the seat rail 16 in a side view of the vehicle. The rear cushion 26 is located rearward of the foremost point of the rear wheel 11R in a side view of the vehicle.

The upper end of the rear cushion 26 is attached to the seat rail 16 and the rear portion 15D of the lower frame member 15 by means of a bracket 78. The upper end of the rear cushion 26 is located forward of the lower end of the rear cushion 26.

The lower end of the rear cushion 26 is attached to the attachment 24A of the rear arm 24. The lower end of the rear cushion 26 is located higher than and rearward of the rotational center C2 of the rear wheel 11R (i.e., a center of the axle) in a side view of the vehicle.

As shown in FIG. 2, the rear cushion 26 is located to the left of the rear wheel 11R as viewed from the rear of the vehicle. That is, the rear cushion 26 does not overlap the rear wheel 11R as viewed from the rear of the vehicle.

Returning to FIG. 5, the drive unit 22 uses electric power supplied by the controller 68 to rotate the rear wheel 11R. The drive unit 22 includes an electric motor 221 and a deceleration mechanism (not shown). The electric motor 221 may be a three-phase induction motor, for example. The deceleration mechanism may be a reduction gear train, for example. The drive unit 22 may include a clutch to permit and prevent transmission of drive forces by the deceleration mechanism, for example. If the drive unit 22 includes a clutch, it may further include a transmission.

The electric motor 221 overlaps the rear wheel 11R in a side view of the vehicle. More specifically, the foremost point of the electric motor 221 overlaps a wheel body 111 of the rear wheel 11R in aside view of the vehicle. The foremost point of the electric motor 221 may overlap a tire 112 attached to a wheel body of the rear wheel 11R in a side view of the vehicle. Further, an output shaft 222 of the electric motor 221 overlaps the wheel body 111 in a side view of the vehicle. "An output shaft 222 overlaps the wheel body 111 in a side view of the vehicle" means that the output shaft 222 overlaps the rim or a spoke of the wheel body 111 in a side view of the vehicle. The spokes move in a circumferential direction as the wheel body 111 rotates. As such, in implementations where the output shaft 222 overlaps a spoke in a side view of the vehicle, the output shaft 222 may not always overlap a spoke. In implementations where the output shaft 222 overlaps a spoke in a side view of the vehicle, it is only required that the output shaft 222 be located inward of the rim as measured in a radial direction of the wheel body 111.

The drive unit 22 further includes a housing 22A. The housing 22A contains the electric motor 221 and deceleration mechanism described above.

The drive unit 22 further includes a plurality of connectors 22B. The connectors 22B are provided on the housing 22A. The connectors 22B include three connectors 78 connected to lines that supply electric power to the drive unit 22 (more specifically, electric motor 221) and a connector 80 connected to a line that transfers signals that control the operation of the drive unit 22 (more specifically, electric motor 221).

The three connectors 78 is located forward of a straight line L3 extending vertically through the point that equally divides the length of the housing 22A as measured in the front/rear direction in a side view (i.e., a center of the housing 22A as measured in the front/rear direction). The three connectors 78 and connector 80 are located forward of the rear cushion 26 in a side view of the vehicle.

The three connectors 78 and connector 80 are located higher than the pivot shaft 64 in a side view of the vehicle. That is, the three connectors 78 and connector 80 are located higher than the swing center SC of the rear arm 24 in a side view of the vehicle.

The three connectors 78 and connector 80 are covered with a cover 82. The cover 82 neatly arranges the lines connected to the three connectors 78 (i.e., power supply lines) and the line connected to the connector 80 (i.e., signal supply line) and guide them to the controller 68.

In the electric motorcycle 10, the drive unit 22 is located on the rear arm 24. Thus, a certain space in which the power supply unit 20 is to be positioned is provided between the head pipe 13 and pivot shaft 64. As such, the power supply unit 20 may include a battery 66 with increased capacity.

In the electric motorcycle 10, the motor 221 overlaps the wheel body 111 in a side view of the vehicle. That is, the drive unit 22 may be positioned close to the rotational center C2 of the rear wheel 11R. Thus, the length of the rear arm 24 as measured in the front/rear direction of the vehicle is able to be reduced. In other words, the pivot shaft 64 may be moved rearward with respect to the vehicle. As such, the space between the head pipe 13 and pivot shaft 64, i.e., the space in which the power supply unit 20 is to be positioned, is able to be enlarged. Thus, a battery 66 with increased capacity is able to be included.

In the electric motorcycle 10, the foremost point of the motor 221 may overlap the tire 112 in a side view of the vehicle. In this case, the drive unit 22 is able to be positioned closer to the rotational center C2 of the rear wheel 11R. Thus, the pivot shaft 64 is able to be moved farther rearward with respect to the vehicle. As such, the space in which the power supply unit 20 is to be positioned is able to be further enlarged. Thus, a battery 66 with increased capacity is able to be included.

In the electric motorcycle 10, the output shaft 222 of the motor 221 extends in the vehicle width direction. Thus, the size of the motor 221 as measured in the vehicle width direction is able to be reduced while providing a certain output of the motor 221, because, if the size of the motor 221 as measured in a radial direction is increased, a certain output of the motor 221 is able to be provided even when the size of the motor 221 as measured in the axial direction (i.e., an axial direction of the output shaft 222) is reduced.

In the electric motorcycle 10, the motor 221 overlaps the wheel body 111 in a side view of the vehicle. Thus, the length of the rear arm 24 (i.e., a length thereof in the front/rear direction of the vehicle) is able to be prevented from increasing even when the size of the motor 221 as measured in a radial direction is increased. In other words, the space in which the power supply unit 20 is to be positioned is able to be prevented from becoming smaller when the pivot shaft 64 is moved forward with respect to the vehicle. As such, a battery 66 with increased capacity is able to be included.

In the electric motorcycle 10, as shown in FIG. 2, the rear cushion 26 does not overlap the rear wheel 11R as viewed from the rear of the vehicle. Thus, a certain space in which the power supply unit 20 is to be positioned is able to be provided for the following reasons.

If a rear cushion overlaps the rear wheel 11R as viewed from the rear of the vehicle, the rear cushion is located forward of the rear wheel 11R. Then, the rear cushion is located between the pair of lower frame members 15. The space between the lower frame members 15 is used to accommodate the power supply unit 20. Thus, if the rear cushion is located between the lower frame members 15, it is difficult to provide a certain space in which the power supply unit 20 is to be positioned.

As discussed above, in the electric motorcycle 10, as shown in FIG. 2, the rear cushion 26 does not overlap the rear wheel 11R as viewed from the rear of the vehicle. Thus, as shown in FIG. 5, the rear cushion 26 is able to be positioned rearward of the lower frame members 15. As such, the space between the lower frame members 15 is able to be effectively used for accommodating the power supply unit 20.

As the space between the lower frame members 15 is able to be effectively used to accommodate the power supply unit 20 as discussed above, the power supply unit 20 is able to be positioned close to the rear wheel 11R.

As shown in FIG. 4, in the electric motorcycle 10, the foremost point of the power supply unit 20 is located forward of the front end of the seat 30 in a side view of the vehicle. The lowermost point of the power supply unit 20 is located lower than the swing center SC of the rear arm 24 in a side view of the vehicle. The uppermost point of the power supply unit 20 is located higher than the pair of upper frame members 14 in a side view of the vehicle. That is, the power supply unit 20 overlaps the upper frame members 14 in a side view of the vehicle.

Thus, in the electric motorcycle 10, the size of the power supply unit 20 is able to be increased. As such, the power supply unit 20 may include a battery 66 with increased capacity.

In the electric motorcycle 10, the foremost point of the power supply unit 20 is located forward of the rearmost point of the upper side 13A of the head pipe 13. Thus, the size of the power supply unit 20 as measured in the front/rear direction is able to be further increased. As such, the power supply unit 20 may include a battery 66 with increased capacity.

In the electric motorcycle 10, the rearmost point of the power supply unit 20 is located rearward of the swing center SC of the rear arm 24. Thus, the size of the power supply unit 20 as measured in the front/rear direction is able to be further increased. As such, the power supply unit 20 may include a battery 66 with increased capacity.

In the electric motorcycle 10, the battery 66 is located higher than the controller 68. Thus, the battery 66 is able to be removed through the upper side while the size of the battery 66 as measured in the front/rear direction is increased.

In the electric motorcycle 10, the foremost point of the battery 66 is located forward of the front end of the seat 30 in a side view of the vehicle. Thus, the size of the battery 66 as measured in the front/rear direction is able to be increased.

In the electric motorcycle 10, the foremost point of the battery 66 is located forward of the rearmost point of the upper side 13A of the head pipe 13 in a side view of the vehicle. Thus, the size of the battery 66 as measured in the front/rear direction is able to be further increased.

In the electric motorcycle 10, the rearmost point of the battery 66 is located rearward of the swing center SC of the rear arm 24 in a side view of the vehicle. Thus, the size of the battery 66 as measured in the front/rear direction is able to be further increased.

In the electric motorcycle 10, the uppermost point of the battery 66 is located higher than the lower side 13B of the head pipe 13 in a side view of the vehicle. Thus, the size of the battery 66 as measured in the top/bottom direction is able to be increased.

In the electric motorcycle 10, the uppermost point of the battery 66 is located higher than the center C1 of the head pipe 13 in a side view of the vehicle. Thus, the size of the battery 66 as measured in the top/bottom direction is able to be further increased.

In the electric motorcycle 10, the lowermost point of the front side 66F of the battery 66 is located lower than the lower side 13B of the head pipe 13 in a side view of the vehicle. Thus, the size of the battery 66 as measured in the top/bottom direction is able to be further increased.

In the electric motorcycle 10, the battery 66 overlaps the front portion 15A and second intermediate portion 15C of the lower frame member 15 in a side view of the vehicle. Thus, the size of the battery 66 as measured in the top/bottom direction is able to be further increased.

In the electric motorcycle 10, the controller 68 is located rearward of the front side 66F of the battery 66. Thus, the controller 68 is able to be positioned close to the drive unit 22. As such, the length of the lines connecting the controller 68 with the drive unit 22 is able to be reduced.

In the electric motorcycle 10, the rearmost point of the controller 68 is located rearward of the straight line L2 in a side view of the vehicle. Thus, the controller 68 is able to be positioned yet closer to the drive unit 22.

In the electric motorcycle 10, the drive unit 22 includes a plurality of connectors 22B. The connectors 22B include three connectors 78 connected to lines that supply electric power to the drive unit 22. The three connectors 78 are located forward of the rear cushion 26 in a side view of the vehicle. Thus, the three connectors 78 are able to be positioned close to the controller 68. As such, the lengths of the lines that supply electric power to the drive unit 22 are able to be reduced.

In the electric motorcycle 10, the three connectors 78 are located forward of the straight line L3 in aside view of the vehicle. Thus, the three connectors 78 are able to be positioned close to the controller 68. As such, the lengths of the lines that supply electric power to the drive unit 22 are able to be reduced.

In the above preferred embodiment, as shown in FIG. 4, the power supply unit 20 includes a battery 66 located higher than the controller 68. Alternatively, for example, as shown in FIG. 6, the power supply unit 221 may include a controller 68A located forward of the battery 66A.

Figure 6:
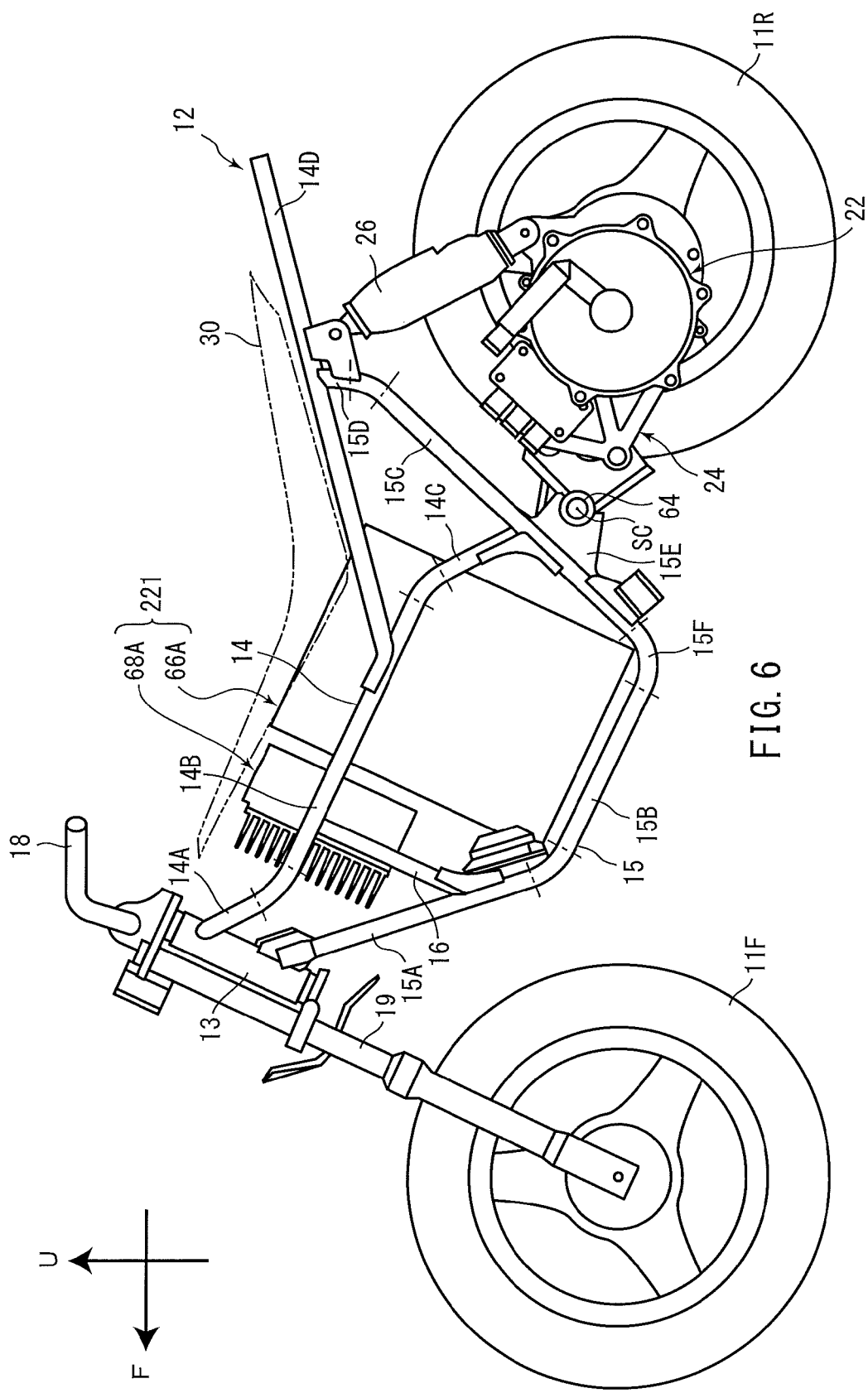
FIG. 6 is a left side view of an example application of an arrangement with a battery and controller.

In the implementation shown in FIG. 6, the lowermost point of the battery 66A is located lower than the swing center SC of the rear arm 24 in a side view of the vehicle. Thus, the size of the battery 66A may be increased as measured in the top/bottom direction. As such, the capacity of the battery 66A is able to be increased.

While preferred embodiments of the present invention have been described, these preferred embodiments are merely examples that are able to be used to carry out the present invention. As such, the present invention is not limited to the preferred embodiments described above, and the preferred embodiments described above are able to be modified as appropriate without departing from the spirit of the present invention.

For example, in the above preferred embodiments, the rear cushion preferably does not overlap the power supply unit in a side view of the vehicle; alternatively, the rear cushion may overlap the power supply unit in a side view of the vehicle.

The present application claims priority to Japanese Patent Application No. 2015-110669 filed on May 29, 2015, the entire contents of which are hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddled electric vehicle comprising:
a rear wheel;
a rear arm supporting the rear wheel such that the rear wheel is rotatable;
a vehicle body frame supporting the rear arm such that the rear arm is swingable;
a seat located above the vehicle body frame;
a drive unit provided on the rear arm to rotate the rear wheel; and
a power supply unit located in the vehicle body frame to supply electric power to the drive unit; wherein
the drive unit includes a motor that overlaps the rear wheel in a side view of the vehicle;
the power supply unit includes:
a battery; and
a controller that supplies electric power stored in the battery to the drive unit;
the vehicle body frame includes:
a head pipe; and
a pivot shaft that supports the rear arm such that the rear arm is swingable;
the power supply unit is located between the head pipe and the pivot shaft in a side view of the vehicle;
a foremost point of the power supply unit is located forward of the seat;
an uppermost point of the power supply unit is located higher than a lower side of the head pipe; and
a rearmost point of the battery included in the power supply unit is located rearward of a foremost point of the seat.

2. The straddled electric vehicle according to claim 1, wherein a lowermost point of the power supply unit is located lower than a shaft center of the pivot shaft.

3. The straddled electric vehicle according to claim 1, wherein
the lower side of the head pipe is located forward of a rearmost point of an upper side of the head pipe; and
the foremost point of the power supply unit is located forward of the rearmost point of the upper side of the head pipe.

4. The straddled electric vehicle according to claim 1, wherein a rearmost point of the power supply unit is located rearward of the pivot shaft.

5. The straddled electric vehicle according to claim 1, wherein the rear wheel includes:
a wheel body; and
a tire attached to the wheel body; wherein
the motor overlaps the wheel body in a side view of the vehicle.

6. The straddled electric vehicle according to claim 5, wherein
the wheel body includes a rim, the tire being attached to the rim; and
a foremost point of the motor overlaps the rim in a side view of the vehicle.

7. The straddled electric vehicle according to claim 5, wherein a foremost point of the motor overlaps the tire in a side view of the vehicle.

8. The straddled electric vehicle according to claim 5, wherein
   the motor includes an output shaft; and
   the output shaft extends in a width direction of the vehicle.

9. The straddled electric vehicle according to claim 8, wherein the output shaft overlaps the wheel body in a side view of the vehicle.

10. The straddled electric vehicle according to claim 5, wherein a distance between a rearmost point of the pivot shaft and a foremost point of the rear wheel as measured in a front/rear direction of the vehicle is smaller than a diameter of the motor.

\* \* \* \* \*